US012810841B2

(12) United States Patent
Moriya et al.

(10) Patent No.: US 12,810,841 B2
(45) Date of Patent: Nov. 24, 2026

(54) PRE-TRAINING METHOD, PRE-TRAINING DEVICE, AND PRE-TRAINING PROGRAM

(71) Applicant: NTT, Inc., Tokyo (JP)

(72) Inventors: Takafumi Moriya, Tokyo (JP); Takanori Ashihara, Tokyo (JP); Yusuke Shinohara, Tokyo (JP)

(73) Assignee: NTT, Inc., Tokyo (JP)

( * ) Notice: Subject to any disclaimer, the term of this patent is extended or adjusted under 35 U.S.C. 154(b) by 286 days.

(21) Appl. No.: 18/275,205

(22) PCT Filed: Feb. 2, 2021

(86) PCT No.: PCT/JP2021/003730

§ 371 (c)(1),
(2) Date: Jul. 31, 2023

(87) PCT Pub. No.: WO2022/168162

PCT Pub. Date: Aug. 11, 2022

(65) Prior Publication Data

US 2024/0071369 A1 Feb. 29, 2024

(51) Int. Cl.
*G10L 15/06* (2013.01)
*G10L 15/16* (2006.01)

(52) U.S. Cl.
CPC ............ *G10L 15/063* (2013.01); *G10L 15/16* (2013.01)

(58) Field of Classification Search
None
See application file for complete search history.

(56) References Cited

U.S. PATENT DOCUMENTS

| | | | | |
|---|---|---|---|---|
| 11,257,481 | B2 * | 2/2022 | Cui | G10L 25/03 |
| 2017/0243114 | A1 * | 8/2017 | Kurata | G06N 3/047 |
| 2018/0197534 | A1 * | 7/2018 | Li | G10L 15/16 |
| 2020/0027444 | A1 * | 1/2020 | Prabhavalkar | G10L 15/02 |
| 2020/0349922 | A1 * | 11/2020 | Peyser | G10L 15/063 |

(Continued)

OTHER PUBLICATIONS

Graves (2012) "Sequence Transduction with Recurrent Neural Networks," in Proc.of ICML.

(Continued)

*Primary Examiner* — Daniel C Washburn
*Assistant Examiner* — Tyler Becker

(57) ABSTRACT

A pre-training method executed by a training apparatus includes converting an input acoustic feature amount sequence into a corresponding intermediate acoustic feature amount sequence having a first length using a first conversion model to which a conversion model parameter is provided, converting a correct answer symbol sequence to generate a first frame unit symbol sequence having the first length and generating a second frame unit symbol sequence having the first length by delaying the first frame unit symbol sequence by one frame, converting the second frame unit symbol sequence into an intermediate character feature amount sequence having the first length using a second conversion model to which a character feature amount estimation model parameter is provided, and performing label estimation using an estimation model to which an estimation model parameter is provided based on the intermediate acoustic feature amount sequence and the intermediate character feature amount sequence.

5 Claims, 12 Drawing Sheets

(56) References Cited

U.S. PATENT DOCUMENTS

| | | | | |
|---|---|---|---|---|
| 2021/0312905 | A1* | 10/2021 | Zhao | G10L 15/16 |
| 2022/0093083 | A1* | 3/2022 | Kurata | G06N 3/044 |

OTHER PUBLICATIONS

Hu et al. (2020) "Exploring Pre-Training Withalignments for RNN Transducerbased End-to-End Speech Recognition," in Proc. of ICASSP, pp. 7074-7078.

* cited by examiner

Fig. 4

ALGORITHM:

- NUMBER P OF SYMBOLS AFTER SEGMENTATION OF CERTAIN WORD
- START POSITION S OF CERTAIN WORD
- START POSITION E OF CERTAIN WORD

INTERVAL S: ALGORITHM FOR ALLOCATING SYMBOLS DIVIDED INTO E TO FRAMES:

$$\left[S + \frac{p-1}{P}(E-S), S + \frac{p-1}{P}(E-S)\right], p = 1, \ldots, P$$

Fig. 5

- NUMBER 5 (“こ”“ん”“に”“ち”“は”) AFTER SEGMENTATION OF “こんにちは”
- START POSITION 1 OF CERTAIN WORD
- START POSITION 10 OF CERTAIN WORD

FRAME UNIT SYMBOL SEQUENCE AFTER EVEN ALLOCATION
“こ”“こ”“ん”“ん”“に”“に”“ち”“ち”“わ”“わ” (LENGTH 10)

INPUT : ACOUSTIC FEATURE AMOUNT SEQUENCE, SYMBOL SEQUENCE
OUTPUT : TWO-DIMENSIONAL OUTPUT SEQUENCE

Fig. 8

Algorithm 1 Expanding token labels to frame-length

```
function LabelExpansion (Y, T, n);
    Input: Token sequence, encoder output length, shift length
    Output: Expanded frame-wise token sequence
Initilize c' ∈ ℤ^{T+n} with blank symbol id
sub_token_length = T//(|Y|+2)
offset = sub_token_length +1+n
for u = 1, ···, |Y| do
    for t = offset, ···, offset + sub_token_length do
        c'_t = y_u
    end for
    offset = offset + sub_token_length +1
end for
returu c'_{1:T}
```

PRE-TRAINING METHOD, PRE-TRAINING DEVICE, AND PRE-TRAINING PROGRAM

CROSS-REFERENCE TO RELATED APPLICATIONS

This application is a U.S. National Stage Application filed under 35 U.S.C. § 371 claiming priority to International Patent Application No. PCT/JP2021/003730, filed on 2 Feb. 2021, the disclosure of which is hereby incorporated herein by reference in its entirety.

TECHNICAL FIELD

The present invention relates to a pre-training method, a pre-training apparatus, and a pre-training program.

BACKGROUND ART

In recent speech recognition systems using a neural network, it is possible to directly output a word sequence from a speech feature amount. For example, a training method of an End-to-End speech recognition system that directly outputs a word sequence from an acoustic feature amount has been proposed (refer to NPL 1, for example).

A method for training a neural network for speech recognition using a training method according to the recurrent neural network transducer (RNN-T) is described in the section "Recurrent Neural Network Transducer" in NPL 1. By introducing a "blank" symbol (described as "null output" in NPL 1) representing redundancy in training of an RNN-T model, it is possible to dynamically train correspondence between speech and output sequences from training data if only content of speech and corresponding phonemes/characters/subwords/word sequences (≠ frame-by-frame) are provided. That is, in training of the RNN-T model, it is possible to perform training using a feature amount and a label of a non-corresponding relationship between an input length T and an output length U (generally T>>D).

However, it is difficult to train the RMM-T model that dynamically allocates phonemes/characters/subwords/words and a blank symbol to each speech frame as compared to an acoustic model of a conventional speech recognition system.

In order to solve this problem, NPL 2 proposes a pre-training method capable of stably training RNN-T. This technology uses a label of a senone (a label in a unit finer than a phoneme) sequence used for training a DNN acoustic model of a conventional speech recognition system (DNN-HMM hybrid speech recognition system). If this senone sequence is used, the position and section of each phoneme/character/subword/word can be ascertained. Frame intervals are evenly allocated to the input frame intervals corresponding to each phoneme/character/subword/word by the number of frame intervals divided by the number of phonemes/characters/subwords/words.

For example, when t=10 and u=5 of ""こ""ん""に""ち""は", t/u=2, resulting in u=10 of ""こ""こ""ん""ん""に" "に""ち""ち""わ""わ". Therefore, a label of a phoneme/character/subword/word is extended to a frame-by-frame label. That is, a sequence length U of a phoneme/character/subword/word is extended to the same length as an input length T.

For each pair of an input feature amount and such an extended frame-by-frame label, processing of the above-described intermediate feature amount extraction, output probability calculation, and model update is repeated in this order, and a model after a predetermined number (conventionally tens of millions to hundreds of millions) of repetitions are completed is used as a trained model.

According to this method, a label in units of frames close to the final output (each phoneme/character/subword/word) can be used, and thus stable pre-training can be performed. In addition, it has been reported that a model having higher performance than a model initialized by random numbers can be constructed by fine tuning of a pre-trained parameter according to RNN-T loss.

CITATION LIST

Non Patent Literature

[NPL 1] Alex Graves, "Sequence Transduction with Recurrent Neural. Networks," in Proc. of ICML, 2012.

[NPL 2] Hu Hu, Rut Zhao, Jinyu Li, Liang Lu, and Yifan Gong, "EXPLORING PRE-TRAINING WITH ALIGNMENTS FOR RNN TRANSDUCER BASED END-TO-END SPEECH RECOGNITION," in Proc. of ICASSP, 2020, pp. 7074-7078.

SUMMARY OF INVENTION

Technical Problem

In the technology described in NPL 2, a label of a senone (label in a unit finer than a phoneme) sequence used in training of a DNN acoustic model of a conventional speech recognition system (DNN-HMM hybrid speech recognition system) is used to create a frame-by-frame label. Creating this senone sequence label requires a very high degree of linguistic expertise, which is inconsistent with the concept of modeling (End-to-End speech recognition model) methods that do not require such expertise. Further, in the method described in NPL 2, the output of the device becomes a three-dimensional tensor, and thus it is difficult to perform calculation according to cross entropy (CE) loss, and costs such as memory consumption and training time during training increase.

An object of the present invention in view of the above-described circumstances is to provide a pre-training method, a pre-training apparatus, and a pre-training program capable of generating a frame-by-frame label without using a label of a senone sequence and easily calculating CE loss.

Solution to Problem

In order to solve the above problem and achieve the object, a pre-training method according to the present invention is a training method executed by a training apparatus, including: converting an input acoustic feature amount sequence into a corresponding intermediate acoustic feature amount sequence having a first length using a first conversion model to which a conversion model parameter is provided; converting a correct answer symbol sequence to generate a first frame unit symbol sequence having the first length and generating a second frame unit symbol sequence having the first length by delaying the first frame unit symbol sequence by one frame; converting the second frame unit symbol sequence into an intermediate character feature amount sequence having the first length using a second conversion model to which a character feature amount estimation model parameter is provided; performing label estimation using an estimation model to which an estimation model parameter is provided based on the intermediate acoustic feature amount sequence and the intermediate character feature amount sequence and outputting an output probability distribution of a two-dimensional matrix; and calculating a cross entropy (CE) loss of the output probability distribution with respect to the first frame unit symbol sequence based on the first frame unit symbol sequence and the output probability distribution.

Advantageous Effects of Invention

According to the present invention, it is possible to generate a frame-by-frame label without using a label of a senone sequence and easily calculate a CE loss.

BRIEF DESCRIPTION OF DRAWINGS

FIG. 4 is a diagram showing an example of an algorithm executed by a sequence length conversion unit shown in FIG. 3.

FIG. 5 is a diagram illustrating processing of creating a symbol sequence in units of frames by the sequence length conversion unit shown in FIG. 3.

FIG. 8 is a diagram showing an example of an algorithm used by a sequence length conversion unit shown in FIG. 6.

DESCRIPTION OF EMBODIMENTS

Hereinafter, an embodiment of the present invention will be described in detail with reference to the drawings. The present invention is not limited to the present embodiment. Further, in the description of the drawings, the same parts are denoted by the same reference signs.

[Embodiment.] Hereinafter, an embodiment of the present invention will be described in detail with reference to the drawings. The present invention is not limited to the present embodiment. Further, in the description of the drawings, the same parts are denoted by the same reference signs.

In the embodiment, a training apparatus for training a speech recognition model will be described. Prior to the description of the training apparatus according to the embodiment, a training apparatus according to prior art will be described as background art. The training apparatus according to the present embodiment is a pre-training apparatus for performing pre-training for satisfactory initialization of model parameters, and a pre-trained model in the training apparatus according to the present embodiment is further trained (fine-tuned according to RNN-T loss).

Figure 1:
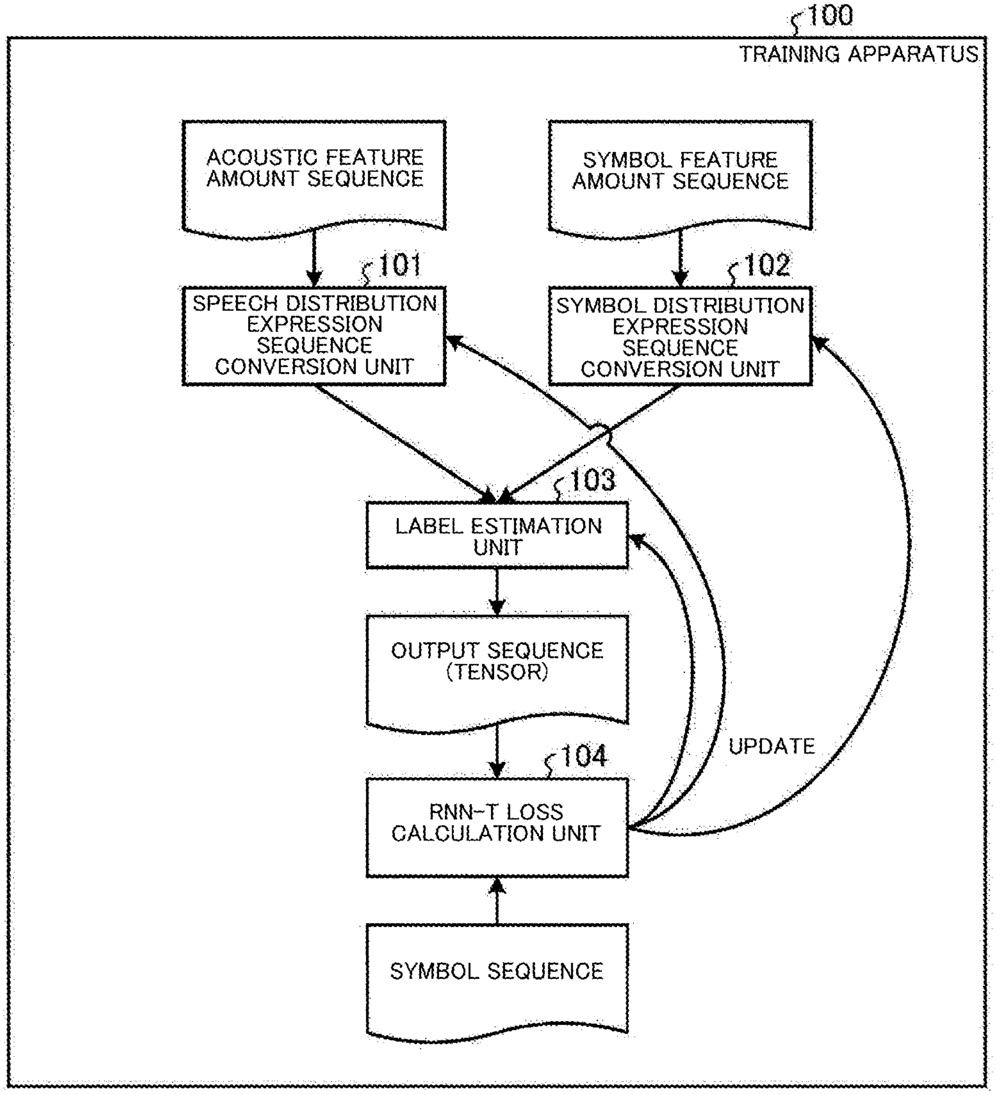
FIG. 1 is a diagram schematically showing an example of a training apparatus according to prior art.

[Background Art] FIG. 1 is a diagram schematically showing an example of a training apparatus according to the prior art. As shown in FIG. 1, the training apparatus 100 according to the prior art includes a speech distribution expression sequence conversion unit 101, a symbol distribution expression sequence conversion unit 102, a label estimation unit 103, and an RNN-T loss calculation unit 104. The input of the training apparatus 100 is an acoustic feature quantity sequence and a symbol sequence (correct answer symbol sequence), and the output is a three-dimensional output sequence (three-dimensional tensor).

The speech distribution expression sequence conversion unit 101 includes an encoder function for converting an input acoustic feature amount sequence X into an intermediate acoustic feature amount sequence H by a multi-stage neural network and outputs the intermediate acoustic feature amount sequence H.

The symbol distribution expression sequence conversion unit 102 converts an input symbol sequence c (length U) or a symbol sequence c (length T) into an intermediate character feature amount sequence C (length U) or an intermediate character feature amount sequence C (length T) of a corresponding continuous value, and outputs the intermediate character feature amount sequence C. The symbol distribution expression sequence conversion unit 102 has an encoder function for converting the input symbol sequence c into a one-hot vector temporarily and converting the vector into an intermediate character feature amount sequence C (length U) or an intermediate character feature amount sequence C (length T) by a multi-stage neural network.

The label estimation unit 103 receives the intermediate acoustic feature amount sequence H, the intermediate character feature amount sequence C (length U), or the intermediate character feature amount sequence C (length T) and estimates a label from the intermediate acoustic feature amount sequence H, the intermediate character feature amount sequence C (length U) or the intermediate character feature amount sequence C (length T) by a neural network. The label estimation unit 103 outputs, as an estimation result, an output probability distribution Y (three-dimensional tensor) or an output probability distribution Y (2-dimensional matrix).

Here, in processing of the label estimation unit 103, a case in which the input is the intermediate character feature amount sequence C (length U) will be described. The output probability distribution Y is obtained on the basis of formula (1).

[Math. 1]

$$y_{t,i}=\mathrm{Softmax}(W_3(\tanh(W_1h_t+W_2c_u+b))) \quad (1)$$

When the dimensions of t and u are different, the output probability distribution Y becomes a three-dimensional tensor because as many dimensions as the number of elements of a neural network are also present in addition to t and u. Specifically, at the time of adding, $W_1H$ is extended by copying the same value in the dimensional direction of U, and $W_2C$ is extended by copying the same value in the dimensional direction of T in the same manner to arrange dimensions, and then three-dimensional tensors are added to each other. Therefore, the output of the label estimation unit 103 also becomes a three-dimensional tensor.

In addition, a case in which the input of the label estimation unit 103 is the intermediate character feature amount sequence C (length T) will be described. The output probability distribution Y is obtained on the basis of formula (2).

[Math. 2]

$$y_t=\mathrm{Softmax}(M_3(\tanh(W_1h_1+W_2c_t+b))) \quad (2)$$

When the dimensions of t and u are identical, there is no extending operation as in the case of using formula (1), and thus the output of the label estimation unit 103 becomes a two-dimensional matrix of the dimension t in the time direction and the dimension of the number of elements of the neural network.

In general, at the time of RNN-T training, training is performed according to RNN-T loss on the assumption that output becomes a three-dimensional tensor. In addition, at the time of inference, there is no extending operation, and thus the output becomes a two-dimensional matrix.

The RNN-T loss calculation unit 104 receives the output probability distribution Y (three-dimensional tensor), the symbol sequence c (length U), or a correct answer symbol sequence (length T), calculates a loss $L_{RNN-T}$ on the basis of formula (3), and outputs the loss $L_{RNN-T}$. The loss $L_{RNN-T}$ may be optimized through the procedure described in "2.5 Training" in NPL 1.

[Math. 3]

$$\text{log–loss } \mathcal{L}=-\ln \Pr(y^*|x) \quad (3)$$

Figure 2:
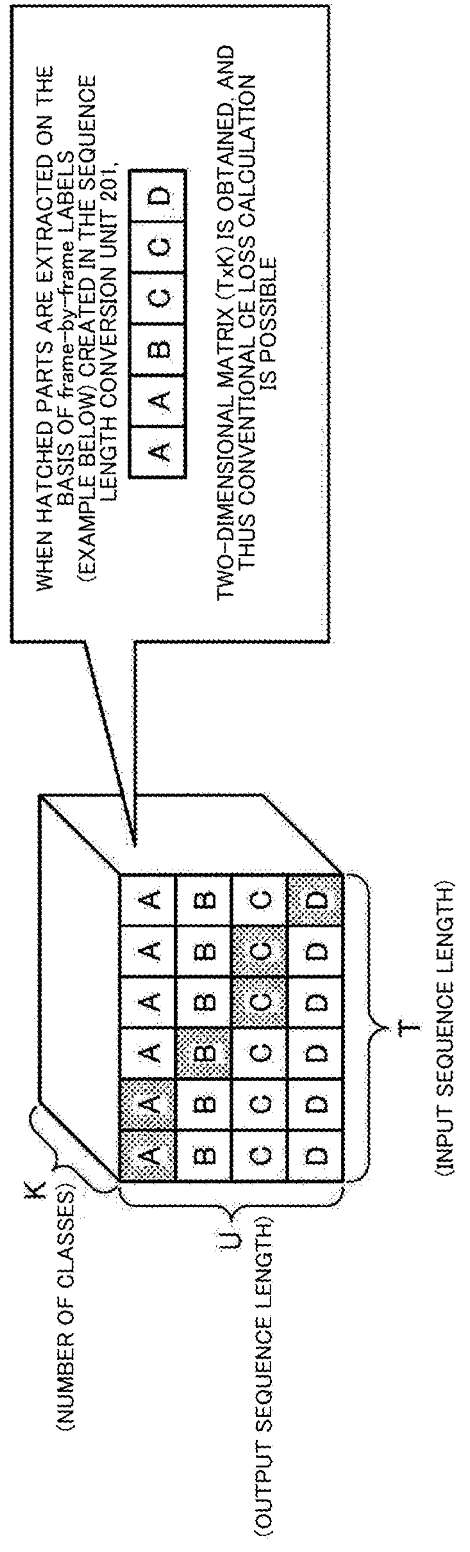
FIG. 2 is a schematic diagram of a three-dimensional tensor.

FIG. 2 is a schematic diagram of a three-dimensional tensor. The RNN-T loss calculation unit 104 creates a tensor (refer to FIG. 2) with a vertical axis U (symbol sequence length), a horizontal axis T (input sequence length), and a depth K (number of classes: number of symbol entries) and calculates the loss $L_{RNN-T}$ on the basis of a forward-backward algorithm for a path with an optimal transition probability in a U×T plane (refer to "2. Recurrent Neural Network Transducer" in NPL 1 for a more detailed calculation process). The training apparatus 100 updates parameters of the speech distribution expression sequence conversion unit 101, the symbol distribution expression sequence conversion unit, and the label estimation unit 103 using this loss $L_{RNN-T}$.

Figure 3:
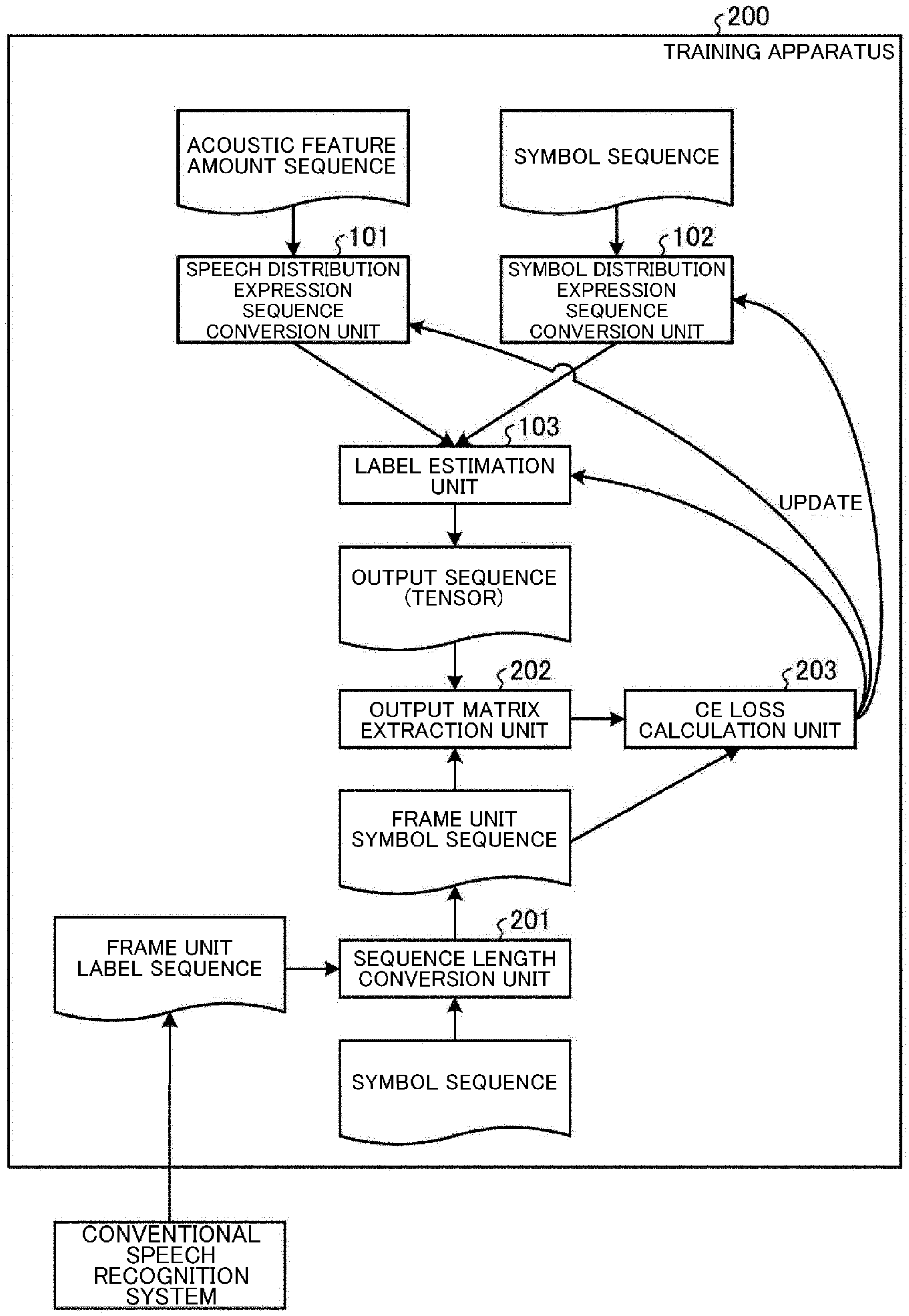
FIG. 3 is a diagram schematically showing an example of another training apparatus according to prior art.

FIG. 3 is a diagram schematically showing an example of another training apparatus according to prior art. As shown in FIG. 3, a training apparatus 200 according to the prior art includes a speech distribution expression sequence conversion unit 101, a symbol distribution expression sequence conversion unit 102, a label estimation unit 103, a sequence length conversion unit 201, an output matrix extraction unit 202, and a CE loss calculation unit 203.

The sequence length conversion unit 201 receives a symbol sequence c (length U) and a frame unit label sequence (senone) s with word information (denoted as "frame unit label sequence" in FIG. 3) and outputs a frame unit symbol sequence c' (length T). The sequence length conversion unit 201 creates a symbol sequence in units of frames on the basis of the frame unit label sequence (senone) and word information used at the time of creation.

FIG. 4 is a diagram showing an example of an algorithm executed by the sequence length conversion unit 201 shown in FIG. 3. FIG. 5 is a diagram illustrating processing of creating a symbol sequence in units of frames by the sequence length conversion unit 201 shown in FIG. 3. FIG. 4 and FIG. 5 show an actual algorithm and an example in a case where a certain word ("こんにちは") is focused. As shown in FIG. 5, the sequence length conversion unit 201 creates a symbol sequence ""こ""こ""ん""ん""に""に""ち""ち""わ""わ" having a length 10 by using the algorithm shown in FIG. 4 for 5 ""こ""ん""に""ち""は"," which is the number after segmentation of "こんにちは."

The output matrix extraction unit 202 receives an output probability distribution Y (three-dimensional tensor) and the frame unit symbol sequence c' (length T) and outputs an output probability distribution Y (two-dimensional matrix). The frame unit symbol sequence c' (length T) generated by the sequence length conversion unit 201 has information of time information t and symbol information c(u). The output matrix extraction unit 202 selects a vector (length K) at a corresponding position from a U×T plane of the three-dimensional tensor using the information and extracts a two-dimensional matrix of T×K (refer to FIG. 2). The training apparatus 200 calculates a CE loss by using a matrix having an estimated value in each frame.

The CE loss calculation unit 203 receives the output probability distribution Y (two-dimensional matrix) and the frame unit symbol sequence c' (length T) and outputs a cross entropy (CE) loss $L_{CE}$. The CE loss calculation unit 203 calculates the CE loss by using formula (4) for the output probability distribution Y (two-dimensional matrix of T×K) extracted by the output matrix extraction unit 202 and the frame unit symbol sequence c' (length T) created by the sequence length conversion unit 201.

[Math. 4]

$$L_{CE}=-\sum_{t=1}^{T}\sum_{k=1}^{K}p'_{k,t}\log y_{k,t} \quad (4)$$

In formula (3), c' represents an element of a matrix C', which is 1 at a correct answer point and 0 in other cases.

The training apparatus 200 updates parameters of the speech distribution expression sequence conversion unit 101, the symbol distribution expression sequence conversion unit 102, and the label estimation unit 103 using the CE loss $L_{CE}$.

Figure 6:
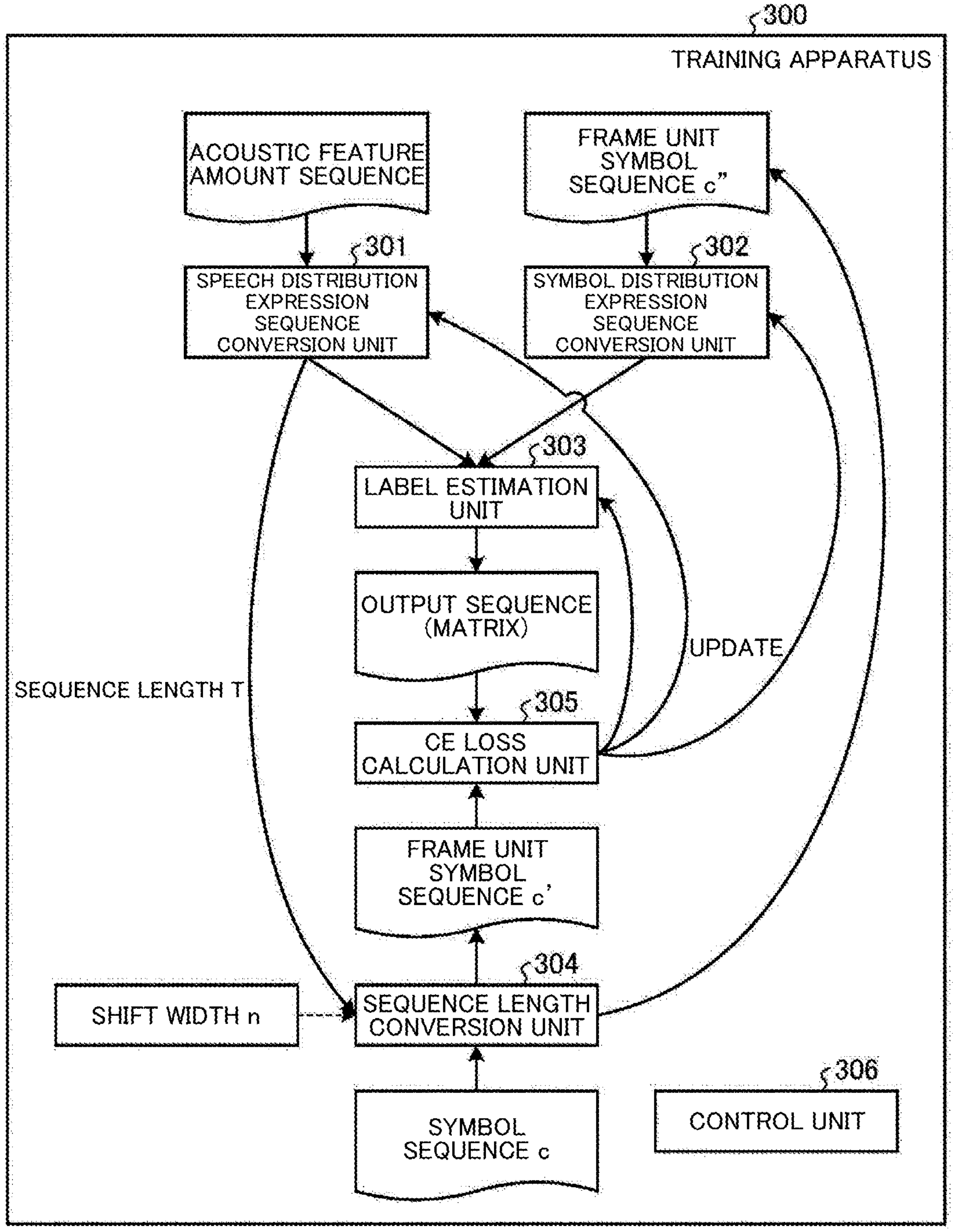
FIG. 6 is a diagram schematically showing an example of a training apparatus according to an embodiment.
Figure 7:
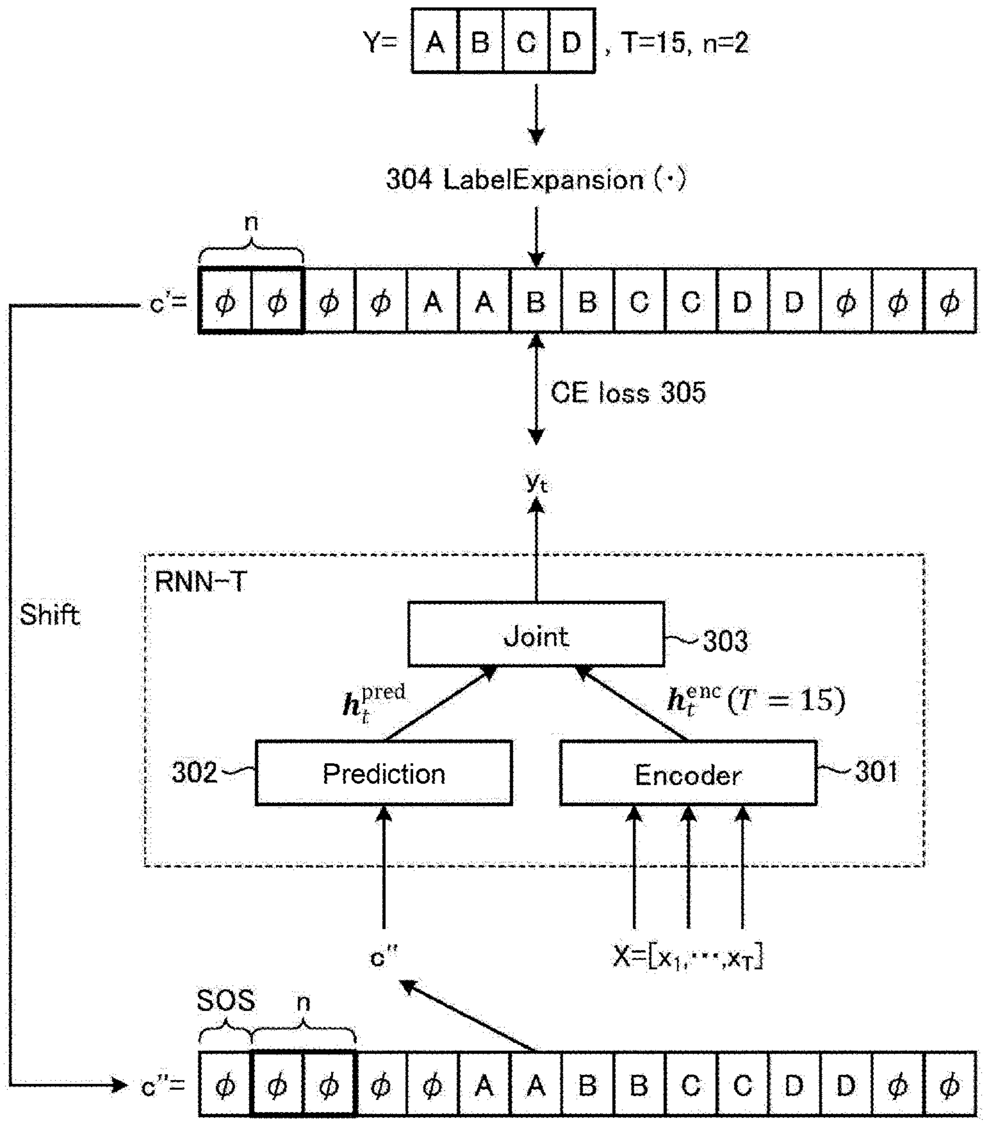
FIG. 7 is a diagram illustrating processing of the training apparatus shown in FIG. 6.

[Training Apparatus according to Embodiment] Next, a training apparatus according to an embodiment will be described. FIG. 6 is a diagram schematically showing an example of a training apparatus according to an embodiment. FIG. 7 is a diagram illustrating processing or the training apparatus 300 shown in FIG. 6.

The training apparatus 300 is realized, for example, by reading a predetermined program by a computer or the like including a read only memory (ROM), a random access memory (RAM), a central processing unit (CPU), and the like and executing the predetermined program by the CPU. The training apparatus 1 also includes a communication interface for transmitting/receiving various types of information to/from other devices connected via a network or the like. For example, the training apparatus 1 includes a network interface card (NIC) or the like and performs communication with other devices via an electric communication line such as a local area network (LAN) or the Internet. Further, the training apparatus 1 includes an input device such as a touch panel, a speech input device, a keyboard, and a mouse, and a display device such as a liquid crystal display, and receives and outputs information.

As shown in FIG. 6, the training apparatus 300 according to the embodiment is an apparatus which receives an acoustic feature amount sequence X and a symbol sequence c (length U) (correct answer symbol sequence) corresponding thereto, and generates and outputs a label sequence (output probability distribution) corresponding to the acoustic feature amount sequence X. The training apparatus 300 includes a speech distribution expression sequence conversion unit 301 (first change unit), a symbol distribution expression sequence conversion unit 302 (third conversion unit), a label estimation unit 303 (estimation unit), a sequence length conversion unit 304 (second conversion unit), and a CE loss calculation unit 305 (calculation unit).

When a conversion model parameter is provided, the speech distribution expression sequence conversion unit 301 converts the input acoustic feature amount sequence X into a corresponding intermediate acoustic feature amount sequence H (length T (first length)). The speech distribution expression sequence conversion unit 301 has an encoder function for converting the input acoustic feature amount sequence X into the intermediate acoustic feature amount sequence H (length T) by a multi-stage neural network and outputting the intermediate acoustic feature amount sequence to the label estimation unit 303. The speech distribution expression sequence conversion unit 301 outputs the sequence length T of the intermediate acoustic feature amount sequence H to the sequence length conversion unit 304.

The sequence length conversion unit 304 receives the symbol sequence c (length U), the sequence length T, and a shift width n. The sequence length conversion unit 304 outputs a frame unit symbol sequence c' (length T) (first frame unit symbol sequence) and a frame unit symbol sequence c" (length T) (second frame unit symbol sequence) obtained by delaying the frame unit symbol sequence c' by one frame.

The symbol distribution expression sequence conversion unit 302 receives the frame unit symbol sequence c" (length T) output from the sequence length conversion unit 304. The symbol distribution expression sequence conversion unit 302 converts the frame unit symbol sequence c" into an intermediate character feature amount sequence c" (length T) using a second conversion model to which a character feature amount estimation model parameter is provided. The symbol distribution expression sequence conversion unit 302 converts the input frame unit symbol sequence c" (length T) into a one-hot vector once and converts the one-hot vector into the intermediate character feature amount sequence C" (length T) by a multi-stage neural network.

The label estimation unit 303 receives the intermediate acoustic feature amount sequence H (length T) output from the speech distribution expression sequence conversion unit 301 and the intermediate character feature amount sequence C" (length T) output from the symbol distribution expression sequence conversion unit 302. The label estimation unit 303 performs label estimation using an estimation model to which an estimation model parameter is provided on the basis of the intermediate acoustic feature amount sequence H (length T) and the intermediate character feature amount sequence C" (length T) and outputs an output probability distribution Y of a two-dimensional matrix. The label estimation unit 3030 performs label estimation by a neural network from the intermediate acoustic feature amount sequence H and the intermediate character feature amount sequence C" (length T). The label estimation unit 303 outputs the output probability distribution Y (two-dimensional matrix) as an estimation result by using formula (2).

The CE loss calculation unit 305 receives the output probability distribution Y (two-dimensional matrix) output from the label estimation unit 303 and the frame unit symbol sequence c' (length T) output from the sequence length conversion unit 304. The CE loss calculation unit 305 calculates a CE loss $L_{CE}$ of an output probability distribution Y with respect to the frame unit symbol sequence c' on the basis of the frame unit symbol sequence c' and the output probability distribution Y by using formula (3).

The control unit 306 controls processing of each functional unit of the training apparatus 300. The control unit 306 updates a conversion model parameter of the speech distribution expression sequence conversion unit 301, a conversion model parameter of the symbol distribution expression sequence conversion unit 302, and a label estimation model parameter of the label estimation unit 303 using the CE loss $L_{CE}$ calculated by the CE loss calculation unit 305.

The control unit 306 repeats processing performed by the speech distribution expression sequence conversion unit 301, processing performed by the sequence length conversion unit 304, processing performed by the symbol distribution expression sequence conversion unit 302, processing performed by the label estimation unit 303, and processing performed by the CE loss calculation unit 305 until a predetermined termination condition is satisfied.

This termination condition is not limited, and for example, may be a condition that the number of repetitions reaches a threshold value, a condition that the amount of change in the CE loss $L_{CE}$ becomes equal to or less than a threshold value before and after repetition, or a condition that the amount or change in the conversion model parameter in the speech distribution expression sequence conversion unit 301 and the label estimation model parameter in the estimation unit 303 becomes equal to or less than a threshold value before and after repetition. In a case where the termination condition is satisfied, the speech distribution expression sequence conversion unit 301 outputs the conversion model parameter $\gamma_1$, and the label estimation unit 303 outputs the label estimation model parameter $\gamma_2$.

Further, the control unit 306 causes RNN-T to pre-train, as an autoregressive model for predicting the next label, a first conversion model, a second conversion model, and an estimation model, by inputting the frame unit symbol sequence c" (length T) obtained by delaying the frame unit symbol sequence c' by one frame to the symbol distribution expression sequence conversion unit 302.

[Sequence Length Conversion Unit] Next, processing of the sequence length conversion unit 304 will be described. FIG. 8 is a diagram showing an example of an algorithm used by the sequence length conversion unit 304 shown in FIG. 6.

First, the sequence length conversion unit 304 adds a blank ("null") symbol to the head and the tail of the symbol sequence c (length U). Next, the sequence length conversion unit 304 creates a vector c' having a length T. Thereafter, the sequence length conversion unit 304 divides the number T of frames of the entire input sequence by the number (U+2) of symbols and recursively allocates symbols to c'.

In addition, in a streaming model operating in left-to-right, there is a possibility that output timing is delayed. Therefore, the sequence length conversion unit 304 can change an offset position to which a symbol is allocated by a shift width n. By recursively allocating final frame unit symbol sequence c' (length T) is obtained.

In addition, the sequence length conversion unit 304 generates a frame unit symbol sequence c" (length T−1) by delaying the frame unit symbol sequence c' by one frame and deleting the tail symbol such that the output formed by the label estimation unit 303 becomes two-dimensional, and inputs the frame unit symbol sequence c" to the symbol distribution expression sequence conversion unit 302. A length T is obtained by adding a blank ("null") symbol to the head of the frame unit symbol sequence c" delayed by one frame. Therefore, the training apparatus 300 pre-trains RNN-T as an autoregressive model for predicting the next label.

Figure 9:
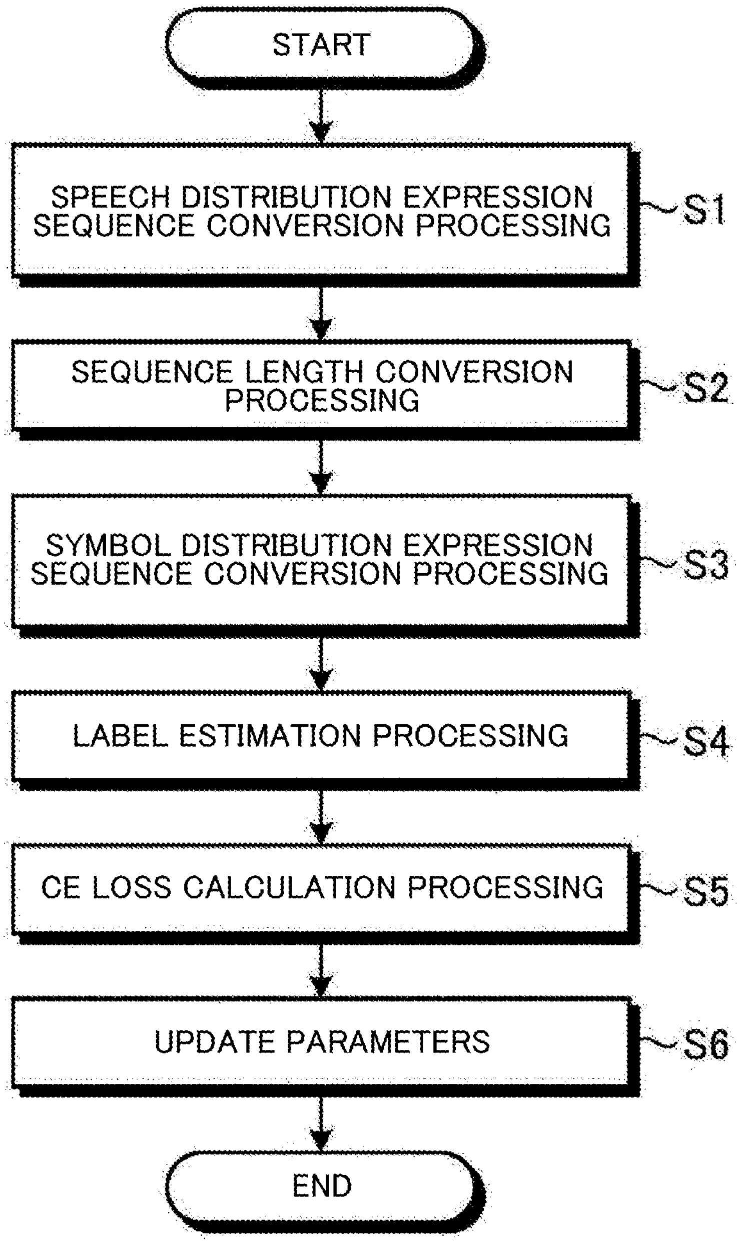
FIG. 9 is a flowchart showing a processing procedure of training processing according to an embodiment.

[Training Processing] Next, a processing procedure of training processing will be described. FIG. 9 is a flowchart showing a processing procedure of training processing according to an embodiment. As shown in FIG. 9, when input of an acoustic feature amount sequence X is received, the speech distribution expression sequence conversion unit 301 performs speech distribution expression sequence conversion processing (first conversion process) for converting the acoustic feature amount sequence X into a corresponding intermediate acoustic feature amount sequence H (length T) (Step S1).

The sequence length conversion unit 304 performs sequence length conversion processing (second conversion process) for converting a symbol sequence c' to generate a frame unit symbol sequence c having a length T and delaying the frame unit symbol sequence c' by one frame to generate a frame unit symbol sequence c" having a length T (length T) (step S2).

The symbol distribution expression sequence conversion unit 302 performs symbol distribution expression sequence conversion processing for converting the frame unit symbol sequence c' (length T) input from the sequence length conversion unit 304 into an intermediate character feature amount sequence C" (length T) (step S3).

Subsequently, the label estimation unit 303 performs label estimation processing (estimation process) for performing label estimation by a neural network on the basis of the intermediate acoustic feature amount sequence H (length T) output from the speech distribution expression sequence conversion unit 301 and the intermediate character feature amount sequence C" (length T) output from the symbol distribution expression sequence conversion unit 302, and outputting an output probability distribution Y of a two-dimensional matrix (step S4).

The CE loss calculation unit 305 performs CE loss calculation processing (calculation process) for calculating a CE loss $L_{CE}$ of the output probability distribution Y with respect to the symbol sequence c on the basis of the frame unit symbol sequence c' and the output probability distribution Y (step S5).

The control unit 306 updates the model parameters of the speech distribution expression sequence conversion unit 301, the symbol distribution expression sequence conversion unit 302, and the label estimation unit 303 using the CE loss (step S6). The control unit 306 repeats the above-describing processing until a predetermined termination condition is satisfied.

[Effects of Embodiment] In the training apparatus 300 according to the embodiment, a frame-by-frame label is dynamically created in the sequence length conversion unit 304, and a label of a senone sequence is not required. That is, the training apparatus 300 does not require a label of a senone sequence which has been conventionally required at the time of dynamically generating a frame-by-frame label. Therefore, since the training apparatus 300 does not use a conventional speech recognition system, it conforms to the End-to-End rule and does not require high-level language specialty, and thus a model can be easily constructed.

In addition, in the training apparatus 300, a frame-by-frame label created in the sequence length conversion unit 304 is shifted by one frame and input to the symbol distribution expression sequence conversion unit 302, and thus the output of the label estimation unit 303 becomes a two-dimensional matrix.

Then, the sequence length conversion unit 304 creates the frame unit symbol sequence c' (length T) and simultaneously creates the frame unit symbol sequence c" (obtained by shifting the frame unit symbol sequence c' by one frame), and inputs the frame unit symbol sequence c" to the symbol distribution expression sequence conversion unit 302.

Accordingly, in the training apparatus 300, the sequence lengths of the outputs of the speech distribution expression sequence conversion unit 301 and the symbol distribution expression sequence conversion unit 302 match, and thus the output of the label estimation unit 303 becomes a two-dimensional matrix. In other words, the label estimation unit 303 can directly form an output probability distribution Y (two-dimensional matrix) in which cross entropy can be calculated in the CE loss calculation unit 305.

Therefore, the output sequence of the label estimation unit 303 becomes a two-dimensional matrix in the training apparatus 300, and thus the CE loss can be easily calculated, and costs of memory consumption and training time during training can be greatly reduced. In addition, in the training apparatus 300, it is expected that the initial value is better than a randomly initialized parameter and that the performance of a model is improved by performing fine tuning according to RNN-T loss. Further, in the training apparatus 300, the frame unit symbol sequence c" obtained by shifting the frame unit symbol sequence c' by one frame is used, and thus RNN-T is pre-trained as an autoregressive model for predicting the next label.

Figure 10:
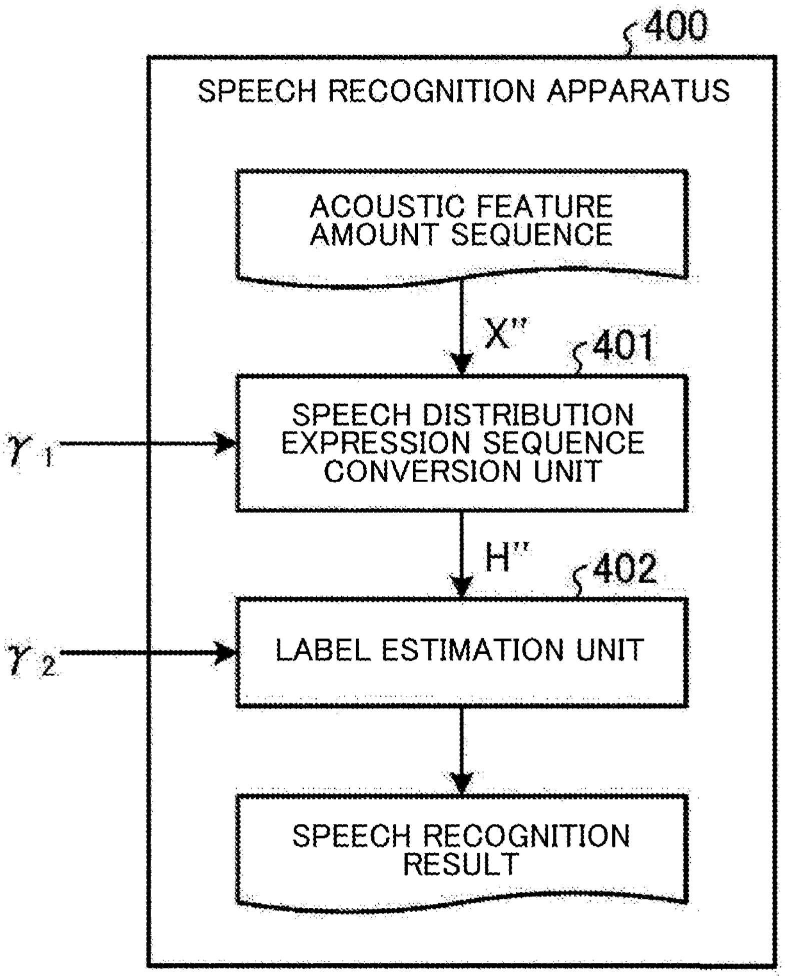
FIG. 10 is a diagram showing an example of a functional configuration of a speech recognition apparatus according to an embodiment.
Figure 11:
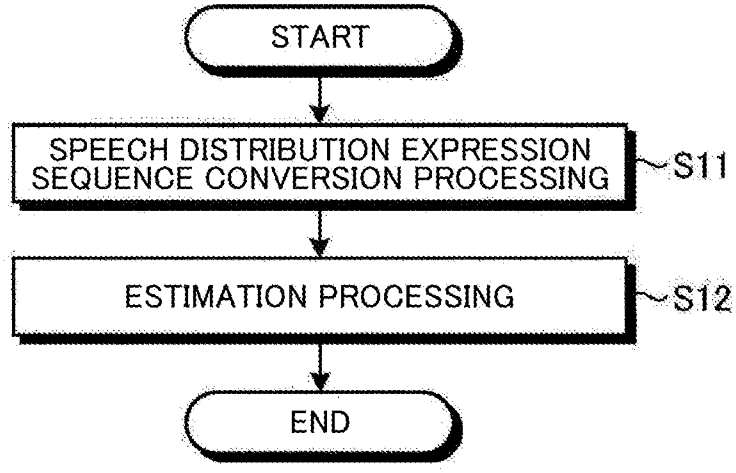
FIG. 11 is a flowchart showing a processing procedure of speech recognition processing in an embodiment.

[Speech Recognition Apparatus] Next, a speech recognition apparatus constructed by providing the conversion model parameter $\gamma_1$ and the label estimation model parameter $\gamma_2$ that satisfy the termination condition in the training apparatus 300 will be described. FIG. 10 is a diagram showing an example of a functional configuration of a speech recognition apparatus according to an embodiment. FIG. 11 is a flowchart showing a processing procedure of speech recognition processing in an embodiment.

As illustrated in FIG. 10, a speech recognition apparatus 400 according to an embodiment includes a speech distribution expression sequence conversion unit 401 and a label estimation unit 402. The speech distribution expression sequence conversion unit 401 is the same as the above-described speech distribution expression sequence conversion unit 301 except that the conversion model parameter $\gamma_1$ output from the training apparatus 300 is input and set. The label estimation unit 402 is the same as the above-described label estimation unit 303 except that the label estimation model parameter $\gamma_2$ output from the training apparatus 300 is input and set.

An acoustic feature amount sequence X" that is a speech recognition target is input to the speech distribution expression sequence conversion unit 401. The speech distribution expression sequence conversion unit 401 obtains and outputs an intermediate acoustic feature amount sequence H" corresponding to the acoustic feature amount sequence X"' in a case where the conversion model parameter $\gamma_1$ is provided (step S11 in FIG. 11).

The intermediate acoustic feature amount sequence H" output from the speech distribution expression sequence conversion unit 401 is input to the label estimation unit 402. The label estimation unit 402 obtains a label sequence (output probability distribution) corresponding to the intermediate acoustic feature amount sequence H in a case where the label estimation model parameter $\gamma_2$ is provided as a speech recognition result and outputs the label sequence (step S12 in FIG. 11).

In this way, model parameters optimized by the training apparatus 300 using CE loss are set in the label estimation unit 402 and the speech distribution expression sequence conversion unit 401 in the speech recognition apparatus 400, and thus speech recognition processing can be performed with high accuracy.

[System Configuration of Embodiment] Each component of the training apparatus 300 and the speech recognition apparatus 400 is a functional concept, and does not necessarily have to be physically configured as illustrated in the drawings. That is, specific manners of distribution and integration of the functions of the training apparatus 300 and the speech recognition apparatus 400 are not limited to those illustrated, and all or some thereof may be functionally or physically distributed or integrated in suitable units according to various types of loads or conditions in which the training apparatus 300 and the speech recognition apparatus 400 are used.

In addition, all or some processing performed in the training apparatus 300 and the speech recognition apparatus 400 may be realized by a CPU, a graphics processing unit (CPU), and a program analyzed and executed by the CPU and the GPU. Further, each type of processing performed in the training apparatus 300 and the speech recognition apparatus 400 may be implemented as hardware according to wired logic.

Moreover, among types of processing described in the embodiments, all or some processing described as being automatically performed can also be manually performed. Or, all or some processing described as being manually performed can also be automatically performed through a known method. In addition, the above-mentioned and shown processing procedures, control procedures, specific names, and information including various types of data and parameters can be appropriately changed unless otherwise specified.

Figure 12:
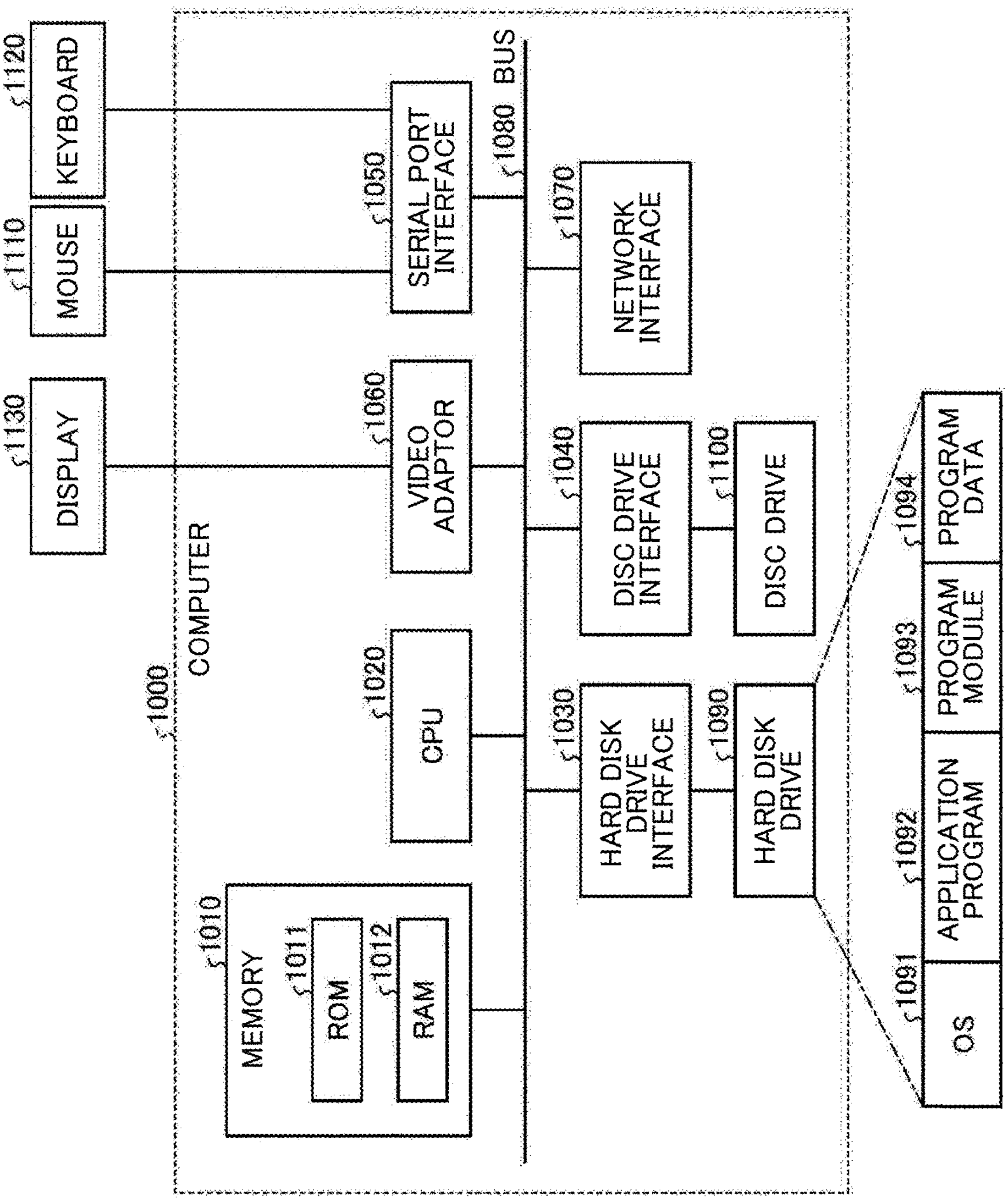
FIG. 12 is a diagram showing an example of a computer that realizes a training apparatus and a speech recognition apparatus by executing a program.

[Program] FIG. 12 is a diagram showing an example of a computer that realizes the training apparatus 300 and the speech recognition apparatus 400 by executing a program. A computer 1000 includes, for example, a memory 1010 and a CPU 1020. Further, the computer 1000 also includes a hard disk drive interface 1030, a disc drive interface 1040, a serial port interface 1050, a video adapter 1060, and a network interface 1070. These units are connected to one another via a bus 1080.

The memory 1010 includes a ROM 1011 and a RAM 1012. The ROM 1011 stores, for example, a boot program such as a Basic Input Output System (BIOS). The hard disk drive interface 1030 is connected to a hard disk drive 1090. The disc drive interface 1040 is connected to a disc drive 1100. For example, a removable storage medium such as a magnetic disk or an optical disc is inserted into the disc drive 1100. The serial port interface 1050 is connected to, for example, a mouse 1110 and a keyboard 1120. The video adapter 1060 is connected to, for example, a display 1130.

The hard disk drive 1090 stores, for example, an operating system (OS) 1091, an application program 1092, a program module 1093, and program data 1094. That is, a program that defines each type of processing of the training apparatus 300 and the speech recognition apparatus 400 is implemented as the program module 1093 in which a code that can be executed by the computer 1000 is described. The program module 1093 is stored in, for example, the hard disk drive 1090. For example, the program module 1093 for executing the same processing as the functional configuration in the training apparatus 300 and the speech recognition apparatus 400 is stored in the hard disk drive 1090. Note that the hard disk drive 1090 may be replaced with a solid state drive (SSD).

Furthermore, the setting data used in the processing of the above-described embodiment is stored, for example, in the memory 1010 or the hard disk drive 1090 as the program data 1094. Then, the CPU 1020 reads the program module 1093 and the program data 1094 stored in the memory 1010 or the hard disk drive 1090 into the RAM 1012 and executes them as necessary.

The program module 1093 and program data 1094 are not limited to being stored in the hard disk drive 1090, and may also be stored in, for example, a removable storage medium and read out by the CPU 1020 via the disc drive 1100. Alternatively, the program module 1093 and program data 1094 may be stored in other computers connected via a network (for example, local area network (LAN) or wide area network (WAN)). Then, the program module 1093 and the program data 1094 may be read by the CPU 1020 from another computer via the network interface 1070.

Although the embodiments to which the invention made by the present inventor has been applied have been described above, the present invention is not limited by the description and the drawings that form a part of the disclosure of the present invention according to the present embodiment. That is, other embodiments, examples, operational techniques, and the like made by those skilled in the art or the like on the basis of the present embodiment are all included in the category of the present invention

REFERENCE SIGNS LIST

- 100, 200, 300 Training apparatus
- 101, 301, 401 Speech distribution expression sequence conversion unit
- 102, 302 Symbol distribution expression sequence conversion unit
- 202 Output matrix extraction unit
- 201, 304 Sequence length conversion unit
- 203, 305 CE loss calculation unit
- 103, 303, 402 Label estimation unit
- 400 Speech recognition apparatus

The invention claimed is:

1. A pre-training method executed by a training apparatus, the pre-training method comprising:
   - converting an input acoustic feature amount sequence of training acoustic data into a corresponding intermediate acoustic feature amount sequence of the training acoustic data using a first conversion model to which a conversion model parameter is provided, wherein the corresponding intermediate acoustic feature amount sequence has a first length in a dimension in a time direction;
   - converting a correct answer symbol sequence of the training acoustic data to (i) generate a first frame unit symbol sequence and (ii) generate a second frame unit symbol sequence by delaying the first frame unit symbol sequence by one frame as at least a part of frame-by-frame labeling of the input acoustic feature amount sequence, wherein converting the correct answer symbol sequence comprises (i) adding a blank symbol to the head and the tail of the correct answer symbol sequence respectively, (ii) creating a vector having the first length in a dimension in a symbol sequence direction, and (iii) generating the first frame unit symbol sequence by recursively allocating, to the created vector, the blank symbols and symbols in the correct answer symbol sequence;

converting the second frame unit symbol sequence into an intermediate character feature amount sequence using a second conversion model to which a character feature amount estimation model parameter is provided, wherein the intermediate character feature amount sequence has the first length in the dimension in the symbol sequence direction;

performing label estimation using an estimation model to which an estimation model parameter is provided based on the corresponding intermediate acoustic feature amount sequence and the intermediate character feature amount sequence and outputting an output probability distribution of a two-dimensional matrix that has the dimension in the time direction and a class dimension;

calculating a cross entropy (CE) loss of the output probability distribution with respect to the first frame unit symbol sequence based on the first frame unit symbol sequence and the output probability distribution; and training, based on the calculated CE loss, the first conversion model by iteratively updating the conversion model parameter, the second conversion model by iteratively updating the character feature amount estimation model parameter, and the estimation model by iteratively updating the estimation model parameter.

2. The pre-training method according to claim 1, further comprising:

updating the conversion model parameter, the character feature amount estimation model parameter, and the estimation model parameter based on the CE loss; and repeating, until satisfying a predetermined terminal condition:

the converting the input acoustic feature amount sequence of training acoustic data into the corresponding intermediate acoustic feature amount sequence of the training acoustic data, the converting the correct answer symbol sequence of the training acoustic data to generate the first frame unit symbol sequence having the first length and generating the second frame unit symbol sequence, the converting the second frame unit symbol sequence into an intermediate character feature amount sequence, the performing the label estimation, and the calculating the CE loss.

3. The pre-training method according to claim 2, wherein the updating operation further comprises inputting the second frame unit symbol sequence having the first length to the converting the second frame unit symbol sequence into the intermediate character feature amount sequence, and the first conversion model, the second conversion model, and the estimation model have been respectively pretrained as an autoregressive model for predicting a next label.

4. A pre-training apparatus comprising:

processing circuitry configured to:

convert an input acoustic feature amount sequence of training acoustic data into a corresponding intermediate acoustic feature amount sequence of the training acoustic data using a first conversion model to which a conversion model parameter is provided, wherein the corresponding intermediate acoustic feature amount sequence has a first length in a dimension in a time direction;

convert a correct answer symbol sequence of the training acoustic data to (i) generate a first frame unit symbol sequence and (ii) generate a second frame unit symbol sequence by delaying the first frame unit symbol sequence by one frame as at least a part of frame-by-frame labeling of the input acoustic feature amount sequence, wherein converting the correct answer symbol sequence comprises (i) adding a blank symbol to the head and the tail of the correct answer symbol sequence respectively, (ii) creating a vector having the first length in a dimension in a symbol sequence direction, and (iii) generating the first frame unit symbol sequence by recursively allocating, to the created vector, the blank symbols and symbols in the correct answer symbol sequence;

convert the second frame unit symbol sequence into an intermediate character feature amount sequence using a second conversion model to which a character feature amount estimation model parameter is provided, wherein the intermediate character feature amount sequence has the first length in the dimension in the symbol sequence direction;

perform label estimation using an estimation model to which an estimation model parameter is provided based on the corresponding intermediate acoustic feature amount sequence and the intermediate character feature amount sequence and to output an output probability distribution of a two-dimensional matrix that has the dimension in the time direction and a class dimension;

calculate a cross entropy (CE) loss of the output probability distribution with respect to the first frame unit symbol sequence based on the first frame unit symbol sequence and the output probability distribution; and train, based on the calculated CE loss, the first conversion model by iteratively updating the conversion model parameter, the second conversion model by iteratively updating the character feature amount estimation model parameter, and the estimation model by iteratively updating the estimation model parameter.

5. A non-transitory computer-readable recording medium storing therein a pre-training program that causes a computer to execute a process comprising:

converting an input acoustic feature amount sequence of training acoustic data into a corresponding intermediate acoustic feature amount sequence of the training acoustic data using a first conversion model to which a conversion model parameter is provided, wherein the corresponding intermediate acoustic feature amount sequence has a first length in a dimension in a time direction;

converting a correct answer symbol sequence of the training acoustic data to (i) generate a first frame unit symbol sequence and (ii) generate a second frame unit symbol sequence by delaying the first frame unit symbol sequence by one frame as at least a part of frame-by-frame labeling of the input acoustic feature amount sequence, wherein converting the correct answer symbol sequence comprises (i) adding a blank symbol to the head and the tail of the correct answer symbol sequence respectively, (ii) creating a vector having the first length in a dimension in a symbol sequence direction, and (iii) generating the first frame unit symbol sequence by recursively allocating, to the created vector, the blank symbols and symbols in the correct answer symbol sequence;

converting the second frame unit symbol sequence into an intermediate character feature amount sequence using a second conversion model to which a character feature amount estimation model parameter is provided, wherein the intermediate character feature amount sequence has the first length in the dimension in the symbol sequence direction;

performing label estimation using an estimation model to which an estimation model parameter is provided based on the corresponding intermediate acoustic feature amount sequence and the intermediate character feature amount sequence and outputting an output probability distribution of a two-dimensional matrix that has the dimension in the time direction and a class dimension;

calculating a cross entropy (CE) loss of the output probability distribution with respect to the first frame unit symbol sequence based on the first frame unit symbol sequence and the output probability distribution; and training, based on the calculated CE loss, the first conversion model by iteratively updating the conversion model parameter, the second conversion model by iteratively updating the character feature amount estimation model parameter, and the estimation model by iteratively updating the estimation model parameter.

* * * * *